(12) United States Patent
Kovesi et al.

(10) Patent No.: US 9,367,925 B2
(45) Date of Patent: Jun. 14, 2016

(54) IMAGE DETECTION AND PROCESSING FOR BUILDING CONTROL

(71) Applicant: enLighted, Inc., Sunnyvale, CA (US)

(72) Inventors: Peter Dominic Kovesi, Shenton Park (AU); Evan Danny Petridis, South Fremantle (AU); Tanuj Mohan, Mountain View, CA (US)

(73) Assignee: enLighted, Inc., Sunnyvale, CA (US)

( * ) Notice: Subject to any disclaimer, the term of this patent is extended or adjusted under 35 U.S.C. 154(b) by 0 days.

(21) Appl. No.: 14/735,851

(22) Filed: Jun. 10, 2015

(65) Prior Publication Data

US 2015/0279051 A1    Oct. 1, 2015

Related U.S. Application Data

(62) Division of application No. 14/016,055, filed on Aug. 31, 2013, now Pat. No. 9,082,202.

(60) Provisional application No. 61/699,946, filed on Sep. 12, 2012.

(51) Int. Cl.
*G06T 7/20* (2006.01)
*G06T 7/40* (2006.01)
*H04N 5/232* (2006.01)

(52) U.S. Cl.
CPC .............. *G06T 7/2033* (2013.01); *G06T 7/2053* (2013.01); *G06T 7/408* (2013.01); *H04N 5/23229* (2013.01); *G06T 2207/10016* (2013.01); *G06T 2207/10024* (2013.01); *G06T 2207/20224* (2013.01); *G06T 2207/30196* (2013.01); *G06T 2207/30232* (2013.01)

(58) Field of Classification Search
CPC .................. G06T 7/2033; G06T 2207/10016; G06T 2207/20224; G06T 7/2053; G06T 2207/20036; G06T 7/20; G06T 7/408; G05B 2219/2642; H04N 5/2351; G06K 9/00771; G06K 9/00221; G06K 9/00362
See application file for complete search history.

(56) References Cited

U.S. PATENT DOCUMENTS

| | | | |
|---|---|---|---|
| 5,101,141 | A | 3/1992 | Warner et al. |
| 5,179,324 | A | 1/1993 | Audbert |
| 5,191,265 | A | 3/1993 | D'Aleo et al. |
| 5,283,516 | A | 2/1994 | Lohoff |
| 5,812,422 | A | 9/1998 | Lyons |
| 6,057,654 | A | 5/2000 | Cousy et al. |
| 6,188,181 | B1 | 2/2001 | Sinha et al. |
| 6,342,994 | B1 | 1/2002 | Cousy et al. |
| 6,548,967 | B1 | 4/2003 | Dowling et al. |

(Continued)

*Primary Examiner* — Jingge Wu
(74) *Attorney, Agent, or Firm* — Brian R. Short

(57) ABSTRACT

Occupancy detection for building environmental control is disclosed. One apparatus includes at least one image sensor and a controller, wherein the controller is operative to obtain a plurality of images from the image sensor, determine a color difference image of a color difference between consecutive images, determine areas of the color difference image wherein the color difference is greater than a threshold, calculate a total change area as an aggregate area of the determined areas, create a list of occupancy candidates based on filtering of the determined areas if the total change area is less than a light change threshold, wherein each occupancy candidate is represented by a connected component, track the one or more occupancy candidates over a period of time, and detect occupancy if one or more of the occupancy candidates is detected to have moved more than a movement threshold over the period of time.

10 Claims, 8 Drawing Sheets

(56) References Cited

U.S. PATENT DOCUMENTS

| | | |
|---|---|---|
| 7,309,985 B2 | 12/2007 | Eggers et al. |
| 7,348,736 B2 | 3/2008 | Piepgras et al. |
| 7,382,271 B2 | 6/2008 | McFarland |
| 7,437,596 B2 | 10/2008 | McFarland |
| 7,550,931 B2 | 6/2009 | Lys et al. |
| 7,566,137 B2 | 7/2009 | Veskovic |
| 7,623,042 B2 | 11/2009 | Huizenga |
| 7,792,956 B2 | 9/2010 | Choong et al. |
| 7,812,543 B2 | 10/2010 | Budike, Jr. |
| 7,925,384 B2 | 4/2011 | Huizenga et al. |
| 9,082,202 B2 * | 7/2015 | Kovesi .................. G06T 7/2053 |
| 2004/0002792 A1 | 1/2004 | Hoffknecht |
| 2005/0134117 A1 * | 6/2005 | Ito ....................... B60R 16/0373 307/10.1 |
| 2005/0169643 A1 | 8/2005 | Franklin et al. |
| 2006/0275040 A1 | 12/2006 | Franklin |
| 2007/0057807 A1 | 3/2007 | Walters et al. |
| 2007/0061050 A1 | 3/2007 | Hoffknecht |
| 2007/0086128 A1 | 4/2007 | Lane et al. |
| 2007/0215794 A1 | 9/2007 | Cernasov et al. |
| 2008/0185977 A1 | 8/2008 | Veskovic et al. |
| 2008/0244104 A1 | 10/2008 | Clemente |
| 2008/0265796 A1 | 10/2008 | Null |
| 2009/0026966 A1 | 1/2009 | Budde et al. |
| 2009/0179596 A1 | 7/2009 | Willaert et al. |
| 2009/0195161 A1 | 8/2009 | Lane et al. |
| 2010/0034386 A1 | 2/2010 | Choong et al. |
| 2010/0135186 A1 | 6/2010 | Choong et al. |
| 2010/0264846 A1 | 10/2010 | Chemal et al. |
| 2010/0270933 A1 | 10/2010 | Chemal et al. |
| 2010/0280677 A1 | 11/2010 | Budike, Jr. |
| 2010/0295482 A1 | 11/2010 | Chemal et al. |
| 2010/0301777 A1 | 12/2010 | Kraemer |
| 2011/0007072 A1 * | 1/2011 | Khan .................... G06T 7/0067 345/420 |
| 2011/0031897 A1 | 2/2011 | Henig et al. |
| 2011/0199020 A1 | 8/2011 | Henig et al. |

\* cited by examiner

IMAGE DETECTION AND PROCESSING FOR BUILDING CONTROL

RELATED APPLICATIONS

This patent application is a divisional patent application of U.S. patent application Ser. No. 14/016,055, filed Aug. 31, 2013, which claims priority to U.S. Provisional Patent Application Ser. No. 61/699,946, filed Sep. 12, 2012, which are both herein incorporated by reference.

FIELD OF THE EMBODIMENTS

The described embodiments relate generally to building controls. More particularly, the described embodiments relate to image detection and processing for building control.

BACKGROUND

Lighting control systems automate the operation of lighting within a building or residence based upon, for example, preset time schedules and/or occupancy and/or daylight sensing. The Lighting systems typically employ occupancy sensors and/or daylight sensors to determine which lighting devices to activate, deactivate, or adjust the light level of, and when to do so. Occupancy sensors typically sense the presence of one or more persons within a defined area and generate signals indicative of that presence. Daylight sensors typically sense the amount of daylight present within a defined area and generate signals indicative of that amount. Typically, lighting systems receive the sensor signals at a central lighting controller.

The lighting systems are advantageous because they typically reduce energy costs by automatically lowering light levels or turning off devices and appliances when not needed, and they can allow all devices in the system to be controlled from one location.

It is desirable to have a method, system and apparatus for improved motion and occupancy detection.

SUMMARY

One embodiment includes an apparatus. The apparatus includes at least one image sensor and a controller, wherein the at least one image sensor is associated with an area of interest, which may exist (for example) within a structure or building. At least one of the controller, or an external controller electronically connected to the controller are operative to obtain a plurality of images from the image sensor, determine a color difference image of a color difference between consecutive images, determine areas of the color difference image wherein the color difference is greater than a threshold, calculate a total change area as an aggregate area of the determined areas, create a list of occupancy candidates based on filtering of the determined areas if the total change area is less than a light change threshold, wherein each occupancy candidate is represented by a connected component, track the one or more occupancy candidates over a period of time, and detect occupancy if one or more of the occupancy candidates is detected to have moved more than a movement threshold over the period of time.

Another embodiment includes another method of detecting occupancy. The method includes obtaining a plurality of images, determining a color difference image of a color difference between consecutive images, determining areas of the color difference image wherein the color difference is greater than a threshold, calculating a total change area as an aggregate area of the determined areas, creating a list of occupancy candidates based on filtering of the determined areas if the total change area is less than a light change threshold, wherein each occupancy candidate is represented by a connected component, tracking the one or more occupancy candidates over a period of time, and detecting occupancy if one or more of the occupancy candidates is detected to have moved more than a movement threshold over the period of time.

Other aspects and advantages of the described embodiments will become apparent from the following detailed description, taken in conjunction with the accompanying drawings, illustrating by way of example the principles of the described embodiments.

DETAILED DESCRIPTION

The described embodiments include image sensing and sensed image processing for controlling environmental parameters of a building, structures, or an area of interest. For at least some embodiments, the environmental parameters include lighting, heating, cooling, humidity, air flow and others. Based on image sensing and processing, any of the environmental parameters can be controlled. While the described embodiments are primarily focused on environmental controls, it is to be understood that other embodiments include other types of building controls, such as, building security.

Figure 1:
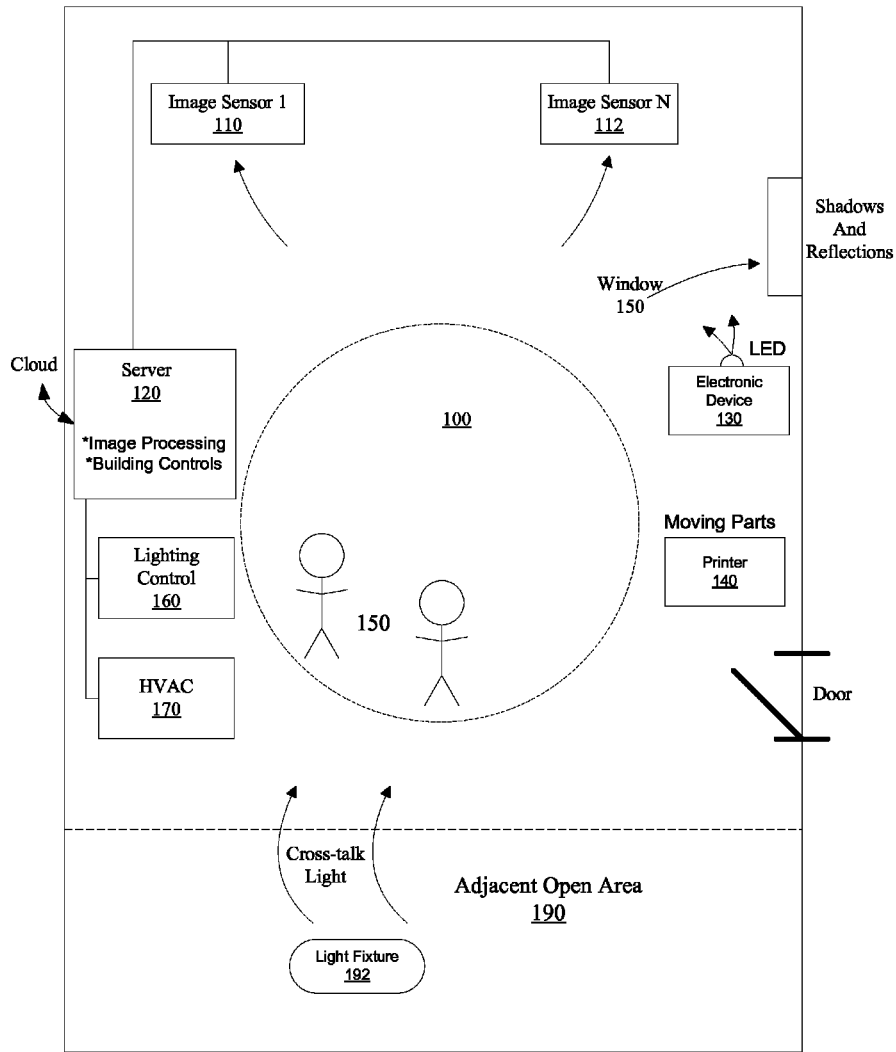
FIG. 1 shows a building that includes an image sensing building control system, according to an embodiment.

FIG. 1 shows a building that includes an image sensing control system, according to an embodiment. While FIG. 1 represents a building, it is to be understood that the described embodiments for controlling light and/or an environmental parameter(s) can be utilized in any type of structure. At least one image sensor of the image sensing control system is arranged to capture images of an area of interest 100. The area of interest can include, for example, a building, a structure, a parking lot, and/or a garage. Additionally, the area of interest can be a different area than where the environmental controls are being applied. The system includes at least one image sensor, such as, image sensors 110, 112. The image sensors 110, 112 sense images within the area of interest 100. For at least some embodiments, a server 120 (and for some embodiments, other controller as well) receives the sensed images, performs processing on the images, and then provides environmental control of the area of interest 100, or any other area, based on the image processing of the sensed images. Exemplary building and/or structure (such as, a parking lot) environmental and/or security controls include lighting control 160 and/or HVAC control 170. Clearly, additional or alternative building control (such as, security) can be included. Additionally or alternatively, building analytics can be monitored.

The image sensors 110, 112 include any type of sensor that generates a sequence of images (continuous, triggered or other), such as, a video camera.

For at least some embodiments, the server 120 may perform processing on the sensed images immediately after they are captured by the image sensors 110, 112. In such embodiments, the image processing is performed in an incremental manner, resulting in environmental control outputs that are available with a minimal time delay after any triggering event takes place in the area of interest. For other embodiments, the processing may take place in a batch mode, where a number of images are gathered from an image sensor and then processed together. While several of the described embodiments may suggest pipeline processing, it is to be understood that the described embodiments for image processing can be implemented according to pipeline processing, batch processing or a combination of both pipeline processing and batch processing.

For at least some embodiments, the image sensors 110, 112 are utilized to sense occupancy by users 150 within the area of interest 100. The environmental control is based at least in part upon the occupancy of the users. For at least some embodiments, the environmental control provides a more comfortable environment for the users 105. For at least some embodiments, the environmental control provides a more cost efficient and/or cost effective use of the area of interest.

As shown, the area of interest 100 includes conditions that can induce false detection of human presence within the area of interest. For example, a blinking LED on an electronic device 130 can provide a false detection of presence by the image sensors 110, 112 and the image processing. Further, mechanical motion of, for example, the paper associated with a printer 140 can provide a false detection of presence by the image sensors 110, 112 and the image processing. Further, shadows and reflection passing through a window 150 of the area of interest 100 can provide a false detection of presence by the image sensors 110, 112 and the image processing. The area of interest 100 may be located adjacent to, for example, an open area 190 that may include lighting (such as, light fixture 192) that emits extraneous light (cross-talk light) that is at least partially received by the image sensors 110, 112, which can also provide false detection of presence by the image sensors 110, 112 and the image processing. Accordingly, the image processing should take into account the possible conditions within the area of interest 100 that can cause false positives of occupancy detection, thereby providing improved environmental control and analytics monitoring of the area of interest 100.

For simplicity, camera-based (image-sensor based) occupancy detection systems are described based around the idea that any occupancy in a scene will intermittently be associated with motion and that the motion induces local changes in the image which can be detected by simple frame differencing. However, detecting occupancy in the scene by taking frame differences should properly recognize ambient lighting change events and reject them as not being motion events. It should be noted that camera automatic gain adjustments can cause similar artifacts. Similarly, detecting motion in the scene by taking frame differences needs to be able recognize that other image changes that are not associated with any occupancy, such as flashing LEDs should be ignored. These artifacts should correctly accounted for by the system and system processing, as will be described.

A lighting change or camera automatic gain adjustment typically does not involve any motion in the scene. Generally, the region of the image that changes is stationary. As far as the frame difference processing is concerned the main thing that distinguishes a lighting change event from an occupancy candidate is that it causes a frame difference over a large contiguous area in the scene whereas frame differences arising from humans moving are relatively small and fragmentary.

At least some of the described embodiments that include tracking allow for the detection of 'non-motion'. For example, a blinking LED or a shiny surface in the scene that picks up occasional reflections may induce a frame difference which exceeds the frame difference threshold. At least some of the described embodiments recognize that there is no motion associated with this category of event. By recording the initial location of a frame difference event and keeping track of the maximum distance that the motion point moves from its initial location, at least some of the described embodiments are able to recognize these 'non-motion' events as being ones that do not move from their initial location.

As previously stated, for at least some embodiments, the server 120 receives the sensed images, performs processing on the images, and then provides environmental control of the area of interest 100 based on the image processing of the sensed images.

Figure 2:
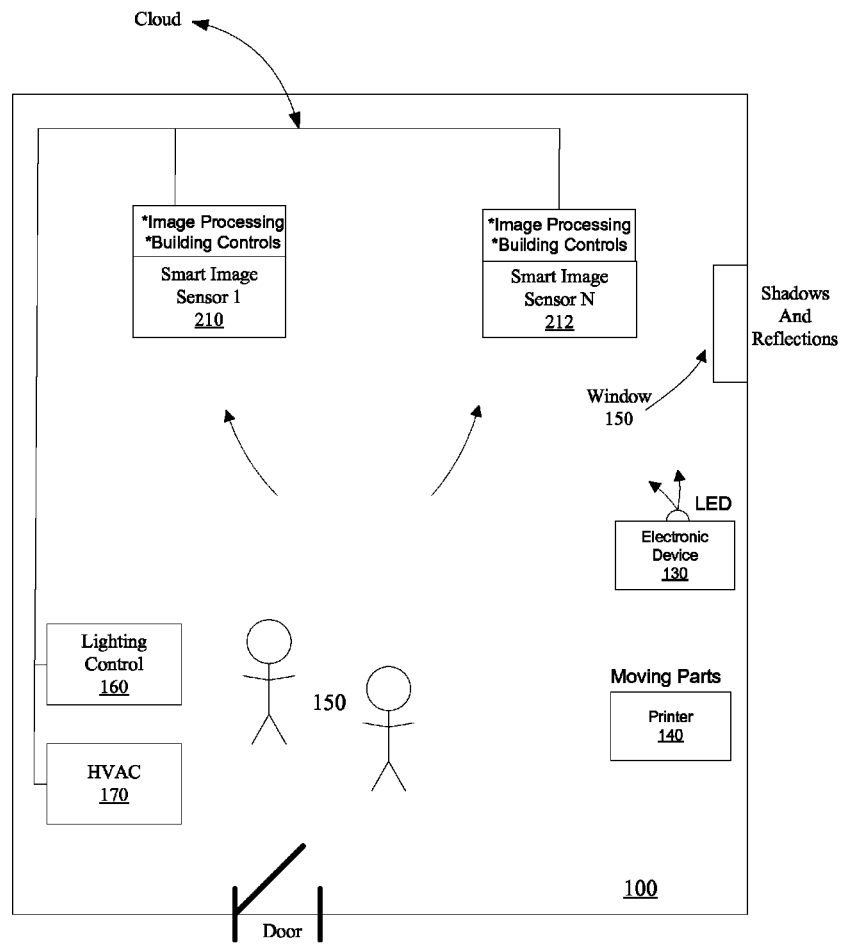
FIG. 2 shows a building that includes an image sensing building control system, according to another embodiment.

FIG. 2 shows a building that includes an image sensing building control system, according to another embodiment. This embodiment includes smart image sensors 210, 212 that include image processing being performed by a controller of one or more of the smart image sensors 210, 212. For various embodiments, the image processing can occur at a single one of the controllers (such as, a controller of a smart image sensor, an external controller interfaced with the image sensor (s), or a completely external controller in the cloud) or the image processing can be distributed amongst multiple of the controllers.

Whether the image processing occurs at a single controller or is distributed amongst a plurality of controllers, at least some embodiments include image processing wherein at least one of the controllers is operative to obtain a plurality of images from the at least one image sensor, determine a color difference image of a color difference between consecutive images of the plurality of images, determining an area of the color difference image wherein the color difference is greater than a threshold, create an occupancy candidate based on filtering of the determined area if the determined area is less than light change threshold, generate one or more centroids that represent areas of the occupancy candidate that are greater than a second threshold, track the one or more centroids over a period of time, detect occupancy if one or more of the centroids is detected to have moved more than a movement threshold over the period of time, and control at least one environmental parameter of the area of interest, or a different area of interest, based on the detected occupancy.

Determining a Color Difference Image of a Color Difference between Consecutive Images of the Plurality of Images For at least some embodiments, if a gray scale is used in the determination of the color difference image of a color difference between consecutive images of the plurality of images, the grey scale information may be obtained from a camera's luminance channel, or by converting RGB values to a grey value, or by extracting, say just the green channel. The difference between two consecutive grey scale images is obtained from the absolute difference in the grey scale values.

If color differences are to be used the difference between two consecutive images can be computed using, for example, one of the CIE Delta E measures of color difference, such as, CIE76 CIE94 or CIEDE2000. Computation of these color differences measures require that the input images are converted to the CIE L*a*b* or CIE L*C*h color space.

For at least some embodiments, an image frame is obtained from video/image stream and down-sampled to a suitable size. For an embodiment, the image frame has a size of 60×100, but clearly different sizes are possible and in fact preferred. An embodiment includes converting to greyscale. An embodiment includes sampling a green channel (or other selected channel) rather than performing a full greyscale conversion. An embodiment includes using a luminance output of a camera to represent the greyscale.

Determining an Area of the Color Difference Image wherein the Color Difference is Greater than a Threshold For an embodiment, the absolute value of the difference between a present frame and the previous one is computed and threshold detected at some level to eliminate noise. Any differences that exceed the threshold level are assumed to be the result of something moving in the interval between the frames. In such an embodiment, the difference between two successive frames caused by a moving object typically produces an 'outline' difference images because only the edges of the moving object produces a difference relative to the previous frame.

For a specific embodiment, an image difference threshold of 20 grey values is used. For an embodiment, a sequence of sensed images is recorded using a wide range of lighting conditions. For an embodiment, the video sequences represent compressed data. This compression introduces quantization of the image values which can be considered a form of noise. Also, the changing of the keyframes that are used in some forms of compressed video introduces additional noise which appears in the difference image intermittently. The difference threshold should be large enough so that compression artifacts are ignored.

An embodiment includes a simple recursive IIR temporal filter as a preprocessing step on the input images in the processing. This is useful in enhancing the sensitivity of the processing to small motions.

For an embodiment, a simple recursive IIR filter is arranged so as to form a 'background image' against which the current image is compared, for the purpose of finding image differences. The IIR filter is a simple way by which a background image can be obtained without being unduly affected by people or other moving objects in the scene. After filtering stationary objects in the scene will appear in the image with low noise and thus it is possible to use a lower, more sensitive, image difference threshold.

For an embodiment, the difference between the present frame and the IIR-filtered background image is then computed and threshold-detected. An object moving in the scene will produce a solid difference region because all parts of the object will be different to the background. If a light change event is detected then the reference background image is reset to the current (post light change) image and the IIR temporal filtering restarted.

Described more generally, the idea is to maintain a 'background image' against which the current image is compared against for the purpose of finding image differences. The IIR filter is a simple way by which a background image can be obtained without being unduly affected by people moving through the scene.

The main advantage of this is that an object moving in the scene produces a 'solid' difference region because all parts of the object will be different than the background. If one simply takes the difference between two successive frames a moving object will typically produce an 'outline' difference images because only the edges of the moving object will produce a difference relative to the previous frame.

Note that this only works well if we do not have any lighting changes. If a light change event is detected then the reference background image needs to be reset to the current (post light change) image and the IIR temporal filtering restarted.

Creating an Occupancy Candidate Based on Filtering of the Determined Area if the Determined Area is Less than Light Change Threshold For at least some embodiments, if the proportion of the area of image that has changed is greater than some threshold, it is assumed this has been caused by a lighting change. For an embodiment, a 'lightChange' flag is set for a predetermined period of time after a light change event. While the lightChange flag is set, difference images are not calculated. The idea of having a 'lightChange' flag is to allow any transients, gain control etc. to settle down before resuming normal operation of the system.

In some situations, the lighting change can be detected one frame too late. Transients leading into the lighting change then input to the processing as artifacts which introduce noise and possible incorrectly identified connected components into the processing. An embodiment addresses this by storing a temporal buffer of input frames. Generation of a difference image on a delayed pair of frames is predicated on the light change status of the current frame pair. If there is no light change, the delayed frame pair is processed as usual, updating the system state. If there is a light change in the current frame pair, the differencing of the delayed frame pair is abandoned, and the system state remains unchanged. This avoids the processing being affected by leading transients to a lighting change.

If a lighting change has been deemed to have occurred there is nothing the processing can sensibly compute from the image. The processing then starts over, and waits for the next frame, again testing the total area of the image that changes in the next frame difference.

For an embodiment, if a lighting change has not occurred, the difference image is then filtered to determine regions of motion. The difference image resulting from a moving object will typically consist of a number of disjoint regions. These are merged together to form an occupancy candidate region. In addition there may also be spurious difference regions resulting from noise in the images which need to be eliminated.

The difference image is filtered with a Gaussian, or Gaussian-like filter. This blurs and smoothes the difference image. The filtered response is strongest where the density of difference regions is high. Thesholding this smoothed image at an appropriate level has the result of coalescing the disjoint regions in the difference image produced by a moving object into a single connected component (or at least a small number of connected components). The thresholding also eliminates small spurious difference regions arising from noise because these occur at a low density and thus do not produce a strong filtered response.

For an embodiment, Gaussian-like filtering is achieved efficiently by applying a summation filter recursively to its own output three times over. This allows filtering to be performed in time proportional to the number of image pixels independent of the desired filter size and only requires integer arithmetic. In another embodiment, an averaging box filter is recursively applied to its own output three times over to obtain an equivalent result. A summation filter is equivalent to an averaging box filter but without the division by the number of elements within the box filter being applied.

An embodiment of the summation filter includes an averaging filter but without the final division by the number of pixels being performed. This means that integer arithmetic can be used. For efficiency, the described embodiments exploit the separability of the filter and perform a 1D running summation on the rows of the image followed by a 1D running summation of the columns of the resulting image to achieve the filtered result. This runs in time proportional to the number of pixels in the image and is independent of the filter size.

The use of a Gaussian or Gaussian-like filter means that pixels in the difference regions close to the center of the filter have more weight, so outlying pixels of the difference regions do not shift the thresholded result around in pixel space, leading to much more stable candidate occupancy region positions and more reliable candidate occupancy region tracking.

For at least some embodiments, the filtered image is then thresholded at a low value, which defines the regions of motion. The thresholding results in a binary image consisting of groupings of connected pixels, known as connected components, with each connected component representing a candidate occupancy region.

For an embodiment, a labeled version of the motion region image is generated. That is, the pixels of each separate 'connected component' in the motion region image are given a unique label.

Generating One or more Centroids that Represent Areas of the Occupancy Candidate that are Greater than a Second Threshold For an embodiment, centroids of each labeled connected component are computed and passed to the tracking code. The motion of the centroid is assumed to represent the motion of the object.

Tracking the One or more Centroids Over a Period of Time

For an embodiment, the tracking code maintains a list of connected component centroids. For an embodiment, each centroid it maintains the following: the initial position of the centroid, the current position of the centroid, the maximum distance the centroid has moved from its initial position and the time since the centroid was last updated.

When the tracking code is called with the current list of connected component centroids, the tracking code attempts to match up the current centroid positions with the centroids in the current list it is maintaining For those that are matched up the current position, maximum distance from initial positions is updated. Centroids in the list that were not matched, have their time since centroid was last updated incremented. Any of the new centroids that were not matched to anything are added to the centroid list as a new centroid to be tracked.

Detecting Occupancy if One or more of the Centroids is Detected to have Moved more than a Movement Threshold Over the Period of Time Tracked centroids are classified as either being 'non-moving' or 'has moved'. A 'non-moving' centroid is one that has never moved more than some threshold distance from the initial location at which it was detected. The aim is to capture image frame difference connected components that result from things such as flashing LEDs, screen savers, oscillating fans, etc under this category.

When a connected component is first detected it is initially classified as non-moving. When its tracked motion takes it beyond a motion distance threshold from the location it was first detected, its classification is changed to has moved. Once a connected component has been classified as has moved, it stays with that classification (Thus, has moved really means this object has moved at some stage).

If a tracked connected component does not move for a certain number of frames it eventually dies and is removed from the list of connected components being tracked. The number of frames before a non-moving connected component is deleted is less than that for a "has moved" connected component.

For an embodiment of lighting control logic, all the updated motion centroid tracks are searched. If there are any tracks where there has been motion and that track has been more than the motion distance threshold from its initial position (that is, it has a classification of 'has moved' and is thus not a flashing LED or similar), the timer is reset. Otherwise the light timeout timer is decremented. If the timer reaches 0, the lights are turned off.

The use of the motion connected component centroids as input to the tracking process keeps the number of objects that has to be tracked to a minimum. However there is a computational cost in performing the binary image labeling.

An alternative would be to try to find peaks in the raw summation filtered image and track these instead. A difficulty with this is that a large number of peaks can end up being detected and hence have to be tracked.

Processing Enhancements

At least some of the described embodiments provide discrimination between likely-humans and other connected components in the image. Connected components that move a significant distance are not a problem. For humans who are moving minimally (for example, sitting at a desk reading), any of the following described techniques can be used. An object that is moving will typically appear in the raw difference image as an outline because it is mostly the moving edges of the object that create the frame differences. (The frame difference between the center of the object and a slightly moved center of the object will typically not be as large). On the other hand a frame difference arising, say, from an object suddenly reflecting light from a new source, or a computer screen waking up or going to sleep will produce a solid connected component in the raw difference image. The difference between the two forms of image difference characteristics could perhaps be recognized by analyzing the topology of the difference image regions and/or the topology of the connected components obtained after filtering and thresholding. An object that has been tracked from the edge of the image inwards is given special status because this has a higher probability of being a human. So even if that connected component stops moving for a considerable length of time, as would be the case if the person sat down and was reading, that connected component can still be retained within our list of candidate humans.

Over time each tracked connected component makes, or does not make, a movement. This movement forms a temporal sequence. The 'rhythmic signature' of this sequence generated by a human is quite different to that generated by an inanimate object. A classification scheme for this temporal sequence is devised, using traditional signal processing or machine learning techniques. The rhythmic signature of each candidate connected component is then classified and this classification conditions the list of candidate humans being tracked. Forming a feature vector of attributes of each connected component being tracked to improve the reliability of tracking and perhaps allow the recognition of tracked objects that have exited the area of interest and then re-entered it. Currently the only attribute of each connected component being used is its centroid.

Additional attributes can also be included. For example, the centroid velocity can be included. A histogram of grey values or color values of the pixels in the input image that correspond to the pixels in the connected component can be included. A histogram of gradients of grey values of the pixels in the input image that correspond to the pixels in the connected component can be included. Clustering of connected components can be included. Despite the filtering to coalesce regions of the difference image into larger connected components it is still possible that some moving objects may end up being represented by two or more connected components. These can be merged by performing a clustering operation on the connected components on the basis of their proximity and on their attribute vectors. For at least some embodiments, a feature vector of attributes is associated with each connected component and is stored, so as to improve the reliability of tracking and allow the recognition of tracked objects that have exited the area of interest and then re-entered it. The feature vector contains the connected component's centroid, and one or more of the following parameters: the centroid velocity, a histogram of grey values or color values of the pixels in the current frame that correspond to the pixels in the connected component, and/or a histogram of gradients of grey values of the pixels in the current frame that correspond to the pixels in the connected component. Connected components are formed into clusters, to associate together multiple connected components that are result from a single moving object. In some cases, the filtering to coalesce regions of the difference image into larger connected components may result in certain moving objects being represented by two or more connected components. These two or more connected components are merged by performing a clustering operation on the connected components, on the basis of their proximity together with their feature attribute vectors.

Figure 3:
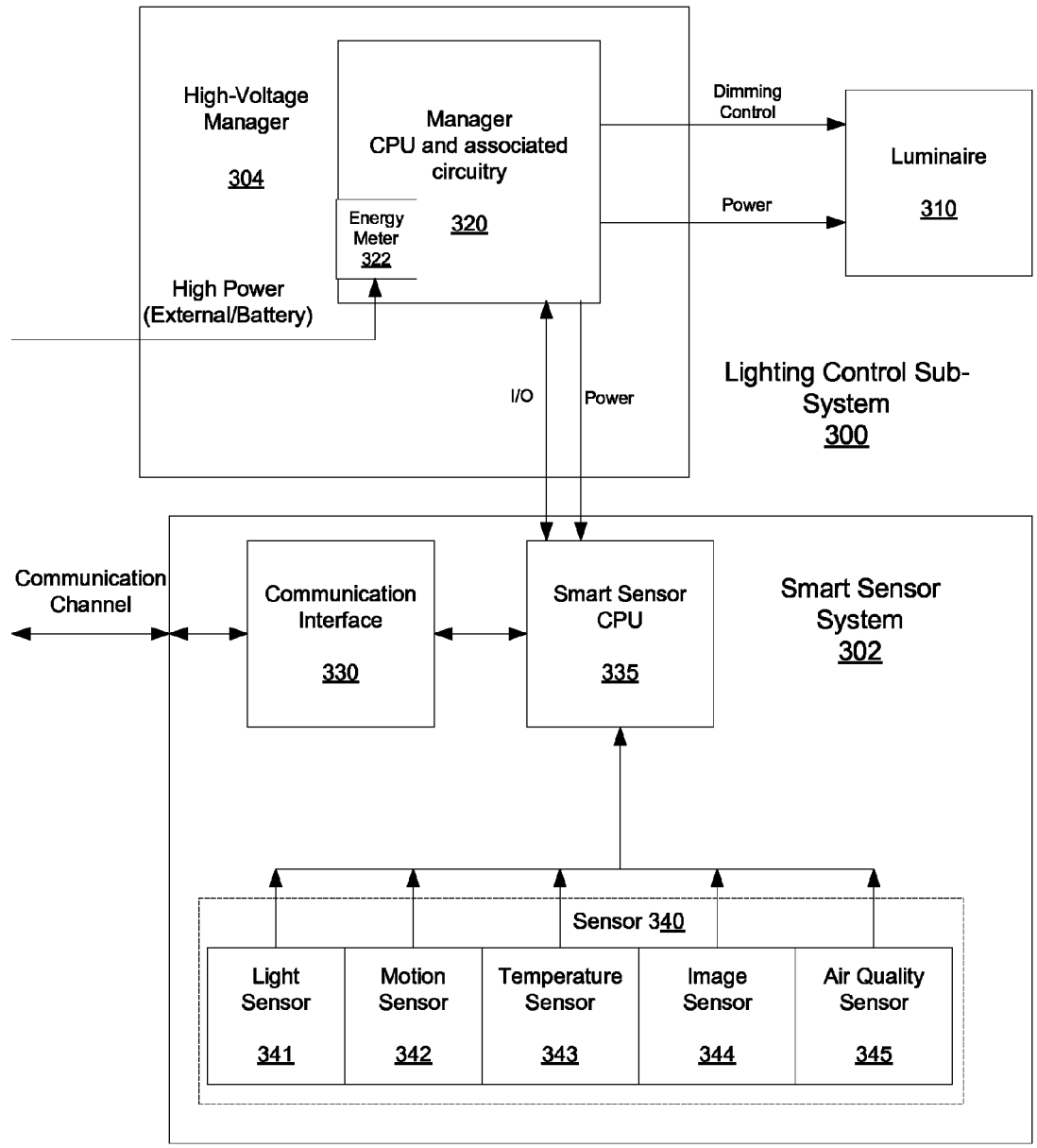
FIG. 3 shows a lighting control sub-system, according to an embodiment.

FIG. 3 shows a lighting control sub-system 300, according to an embodiment. For at least some embodiments, the lighting control sub-system 300 is operable as the image sensors 110, 112 of FIG. 1, or as the smart image sensors 210, 212 of FIG. 2. The lighting control sub-system 300 includes many other sensors than just the image sensor. For at least some embodiments, the other sensor can be used to supplement the motion and occupancy sensing of the described embodiments for motion and occupancy sensing through image sensing and processing. For an embodiment, the image sensing and processing is used to control the lighting intensity of a luminaire 310.

The exemplary lighting control sub-system 300 includes a smart sensor system 302 that is interfaced with a high-voltage manager 304, which is interfaced with the luminaire 310. The high-voltage manager 304 includes a controller (manager CPU) 320 that is coupled to the luminaire 310, and to a smart sensor CPU 335 of the smart sensor system 302. As shown, the smart sensor CPU 335 is coupled to a communication interface 330, wherein the communication interface 330 couples the controller to an external device. The smart sensor system 302 additionally includes a sensor 340. As indicated, the sensor can include one or more of a light sensor 341, a motion sensor 342, and temperature sensor 343, and camera 344 and/or an air quality sensor 345. It is to be understood that this is not an exhaustive list of sensors. That is additional or alternate sensors can be utilized for lighting and/or environmental control of an area of interest that utilizes the lighting control sub-system 300. The sensor 340 is coupled to the smart sensor CPU 335, and the sensor 340 generates a sensed input.

According to at least some embodiments, the controllers (manager CPU 320 and the smart sensor CPU) are operative to control a light output of the luminaire 310 based at least in part on the sensed input, and communicate at least one of state or sensed information to the luminaire.

For at least some embodiments, the high-voltage manager 304 receives the high-power voltage and generates power control for the luminaire 310, and generates a low-voltage supply for the smart sensor system 302. As suggested, the high-voltage manager 304 and the smart sensor system 302 interact to control a light output of the luminaire 310 based at least in part on the sensed input, and communicate at least one of state or sensed information to the external device. The high-voltage manager 304 and the smart sensor system 302 can also receive state or control information from the external device, which can influence the control of the light output of the luminaire 310. While the manager CPU 320 of the high-voltage manager 304 and the smart sensor CPU 335 of the smart sensor system 302 are shown as separate controllers, it is to be understood that for at least some embodiments the two separate controllers (CPUs) 320, 335 can be implemented as single controller or CPU.

For at least some embodiments, the communication interface 330 provides a wireless link to external devices (for example, a central controller and/or other lighting sub-systems).

An embodiment of the high-voltage manager 304 of the lighting control sub-system 300 further includes an energy meter 322 (also referred to as a power monitoring unit), which receives the electrical power of the lighting control sub-system 300. The energy meter 322 measures and monitors the power being dissipated by the lighting control sub-system 300. For at least some embodiments, the monitoring of the dissipated power provides for precise monitoring of the dissipated power. Therefore, if the manager CPU 320 receives a demand response (typically, a request from a power company that is received during periods of high power demands) from, for example, a power company, the manager CPU 320 can determine how well the lighting control sub-system 300 is responding to the received demand response. Additionally, or alternatively, the manager CPU 320 can provide indications of how much energy (power) is being used, or saved.

For the embodiments described, the lighting control system includes a plurality of the lighting control sub-system, such as the lighting control sub-system 300 of FIG. 3. Generally, the purpose of the lighting control system is to control illumination so that the appropriate illumination is provided only when and where it is needed within a building or area of interest in which the lighting system is located. Ideally, the lighting control system operates at the lowest cost over the lifetime of the lighting control system. The costs include both the installation (generally referred to as the CAPEX (capital expenditure)) and the ongoing operational cost (generally referred to as the OPEX (operational expenditure)), which includes the energy costs and the maintenance costs (such as bulb replacement, inspection), and operation of a central controller. The actual illumination needs generally changes over the lifetime of the lighting control system due to changing building occupancy levels and usage, and by changes in occupant needs. A building that is expected to see changes in illumination needs, requires a lighting control system that provides low cost changes to reduce the total cost and to extend its lifetime. Additionally, as the technology of luminaires changes over time, the ideal lighting control system supports replacement of the luminaires without the need to replace components of the lighting control system. While lowering the costs, the ideal lighting control system should enhance occupant productivity, well-being, and security. Also, the ideal system should gather operational status and statistics so that the actual operation can be compared with the desired operation, and the design assumptions (such as occupancy patterns) can be validated, and the configuration changed, if needed, when the design is changed to match the actual use.

At least some embodiments of the lighting control system include a plurality of the lighting control sub-system. Each of the lighting control sub-systems can operate independently, in coordination with other lighting control sub-systems (for example, existing hard-wired systems), and/or in coordination with a central controller. As such, each of the lighting control sub-systems can be independently installed, and adapt their operation accordingly.

As previously stated, an embodiment of the lighting control sub-system includes a communication interface, a controller (listed in discussion as a single controller, but as previously described, at least some embodiment include multiple controllers, such as, the high-voltage manager 304 and the smart sensor CPU 335), a luminaire, a light sensor, and an image sensor. For an embodiment, the luminaire is a lighting unit consisting of one or more lamps, socket(s) and parts that hold the lamp(s) in place and protect them, wiring that connects the lamp(s) to a power source, and reflector(s) to help direct and distribute the light. Various embodiments of luminaires include bulb technologies, such as incandescent, florescent, and LED (light emitting diode). Further, various embodiments of the luminaires are controllably turned on and off, and further, are controllably dimmable.

For at least some embodiments, the controller makes decisions as to turning on, turning off, and dimming the luminaires. The controller does this, for example, either due to command from an external device (such as, the central controller), or by processing decision rules using inputs from the sensors, a saved configuration, time of day, passage of time from past sensor inputs, and/or from state or sensor values from other sub-systems. Additionally or alternatively, learned behavior can influence the decisions.

In its most basic configuration, the controller only controls turning at least one luminaire on or off (no dimming) using simple rules and only inputs from an image sensor and light sensor and passage of time. For an embodiment, the controller is split into two physical modules as shown in FIG. 3. The first module is called the powerpack (referred to as the high-voltage manager 304), and contains the following sub-modules: power transformer (AC to DC voltage), relay to disrupt power to the luminaire, power meter, one model sends dimming control signal (and other model passes a dimming control signal) to the luminaire, and "watch dog" support to restart the other module of the controller if it becomes unresponsive. The second module (referred to as the smart sensor system 302) houses the image, and temperature sensors, a processor, persistent storage for configuration, and the wireless interface. The processor in this module executes the rules for controlling the light level of the luminaire.

For an embodiment, the controller is co-located with the luminaire. Also, at least some embodiments of the luminaire have chambers wherein the controller can be housed, or are designed for an external chamber to be attached that can house the controller.

For at least some embodiments, the controller intercepts power sources going to the luminaire and provides on/off controlled power. An embodiment of the controller also provides a 0 to 10v control signal to the luminaire, and if supported by the luminaire, for dimming.

For at least some embodiments, the sensors sense (or measures) some physical quantity and converts it into a digital value. For an embodiment, the sensors are packaged together with the controller. More specifically, for various embodiments of the lighting control sub-system, multiple sensors of the lighting control sub-system include a motion sensor, a light sensor, and temperature sensors located in the same physical module, which is connected to the other physical modules with a cable. For an embodiment, the sensor(s) are physically located beside the luminaire, and the image and light sensors are directed towards the floor of an area of interest in which the lighting control sub-system is located. For an embodiment, the sensor(s) are directly connected to the controller.

For an embodiment, the controller is further operative to receive information from an external device, wherein the received information influences a current state of the lighting control sub-system, or the received information includes parameters that influence a future state of the lighting control sub-system. For an embodiment, the received information influences a lighting control sub-system profile. For an embodiment, the lighting sub-system profile includes a set of values (parameters) that affect the operation of the controller in determining how it controls the light output of the luminaire based on current and past sensor inputs, time of day or passage of time. For at least some embodiments, the parameters are adaptively updated.

For at least some embodiments, the controller is operative to receive a plurality of lighting control sub-system profiles. That is, there can be more than one lighting control sub-system profile, and the lighting control sub-system profiles can be adaptively updated. More specifically, an active profile or present profile of the plurality of lighting control sub-system profiles can be adaptively updated. Further, for at least some embodiments, the external device can add, replace or delete one or more profiles of the plurality of lighting control sub-system profiles.

As previously stated, the external device can be a central controller or another lighting control sub-system. Further, the external device can include a logical group controller, or a terminal. For at least some embodiments, a terminal is a device that allows interaction with the lighting control sub-system in a form that can be done by humans in a language that is human readable.

An embodiment of a logical group controller provides control over a plurality of lighting control sub-systems, wherein the plurality of lighting control sub-systems are all a member of the logical group. The size of a logical group is dynamic. Further, any one of the lighting control sub-systems can be member of any number of logical groups, wherein each logical group can include a different set of members. For an embodiment, the external device looks like a traditional light wall switch but with several buttons or controls. The external device is used to affect all lighting control sub-systems in the logical group to turn them on or off, and/or to set them to configured light levels that are appropriate for the use of the space in which the logical group of lighting control sub-systems is located. For example, such as viewing output from a projector on a screen, or listening to a formal presentation.

At least some embodiments include a plurality of sensors, wherein the controller is operative to control the light output based on a combination of sensed inputs of the plurality of sensors. The sensors can include, for example, ambient light sensors and occupancy sensors. Additionally, timing and scheduling controls can be provided by clocks and/or timers. At least some embodiments further include the controller operative to control the light output based on the combination of one or more of the sensed inputs and a lighting schedule. For example, during a work time (known occupancy of, for example, an office building) a light in a work area may be restricted from turning off. However, during non-work times, the light can be turned off if no one is present. If utilizing a lighting schedule, clearly the lighting control sub-system includes and/or has access to a clock and/or a timer.

For at least some embodiments, the controller is operative to receive a lighting control configuration. For an embodiment, the lighting control configuration includes the above-described lighting sub-system profile. For an embodiment, the controller receives the lighting control configuration from a system operator. This includes (but is not limited to), for example, a situation where an operator sets the configuration using dip switches that are physically located on the sub-system. For an embodiment, the controller receives the lighting control configuration from a central controller, thereby allowing a system user to manage the lighting control configuration.

For an embodiment, the controller is operative to collect sensor values over time based on at least the sensed input. Again, the controller has access to a clock and/or a timer. For an embodiment, the controller is operative to communicate the collected sensor values to the external device. For example, a value of occupancy can be determined every X seconds, saved for the last Y minutes, and then reported to the external device or central controller. For an embodiment, the controller is operative to identify problems of operation of the lighting control sub-system based on the collected sensor values, and to report the identified problems of operation to the external device. For example, the controller can report that the temperature is too high or too low. The controller can report that a light has burned out, or report a loss of coupling with the luminaire. For at least some embodiments, the controller is operative to report past operating characteristics of the sub-system. For example, the controller can report light level changes.

For at least some embodiments, the sensor includes a power monitoring unit (such as, the energy meter 322) operative to measure power usage of the lighting control sub-system. Further, for at least some embodiments, the controller is operative to communicate the measured power usage of the sub-system to the external device.

As will be described in detail, for at least some embodiments, the controller is operative to communicate with other sub-systems, and identify logical groups of two or more sub-systems. For at least some embodiments, identifying logical groups comprises at least the controller and at least one of the other sub-systems auto-determining the logical group. For an embodiment, at least one of the logical groups includes a motion sensing group. For an embodiment, at least one of the logical groups includes an ambient light group. For an embodiment, at least one of the logical groups includes a logical switch group. For an embodiment, at least one of the logical groups includes a logical temperature group.

For an embodiment, the controller is operative to control the light output based on a sensor signal of a sensor of another sub-system of a common logical group. For an embodiment, sub-systems of a common logical group communicate to each other when a sensor of one of the sub-systems of the logical group has failed.

For an embodiment, the controller is operative to identify an emergency condition, and initiate an emergency mode. For a specific embodiment, the controller is operative to confirm the identification of the emergency mode, including the controller initiating communication with a non-emergency device, and confirming the identified emergency condition if the initiated communication is not successful.

Figure 4:
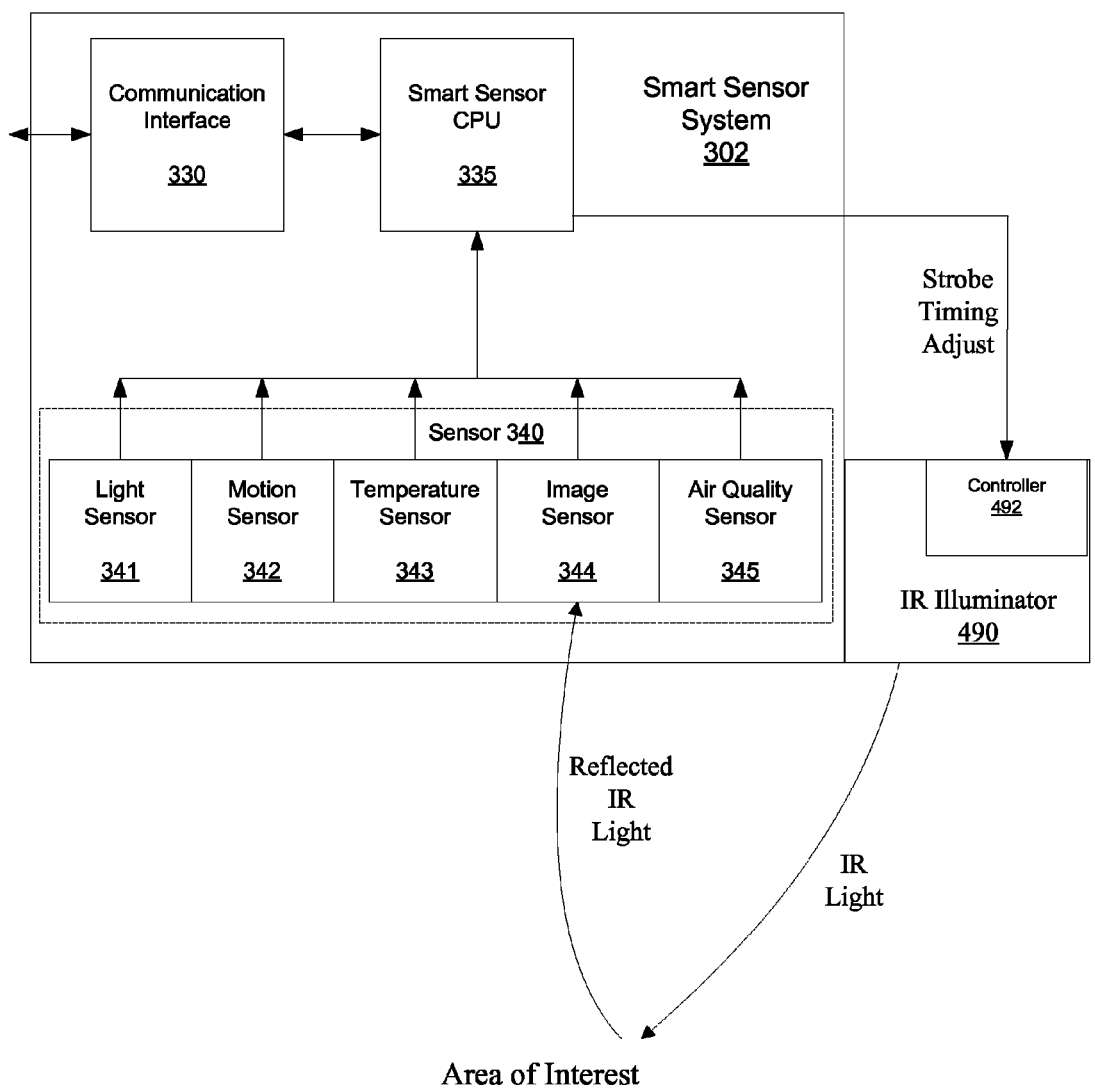
FIG. 4 shows a smart sensor system and an IR Illuminator, according to an embodiment.

FIG. 4 shows a smart sensor system 302 and an infrared (IR) illuminator 490, according to an embodiment. For at least some embodiments, the IR illuminator 490 is powered if lighting in the area of interest is sensed to be below a lighting threshold. Specifically, for an embodiment, the occupancy detection includes analyzing a plurality of images acquired at a location in which occupancy is being detected, and powering the IR illuminator 490 proximate to the image sensor 344 that is obtaining a plurality of images if lighting proximate to the image sensor 344 is sensed to be below a lighting threshold.

As shown, for this embodiment, the IR illuminator 490 includes a controller 492, and an input that allows for interrupted operation of the IR illuminator 490. As shown, for an embodiment, the IR illuminator 490 generates IR light that is reflected off of objects of the area of interest. The image sensor 344 senses images based at least in part on the reflected IR light.

For an embodiment, the IR illuminator 490 is placed adjacent to the image sensor 344 and/or the smart sensor system 302. For an embodiment, the IR illuminator 490 is integrated with the image sensor 344 and/or the smart sensor system 302.

At least some embodiments include or allow for reducing (adjusting) a frame or image rate of the plurality of images. Further, at least some embodiments include the IR illuminator 492 being enabled and disabled so that its on-periods coincide only with the required exposure time of image capture by the image sensor. In between image captures by the image sensor, the IR Illuminator is disabled. Further, at least some embodiments include adapting the rate of frame capture by the image sensor, together with the synchronous activation of the infrared illuminator, based on a desired or require power consumption.

Figure 5:
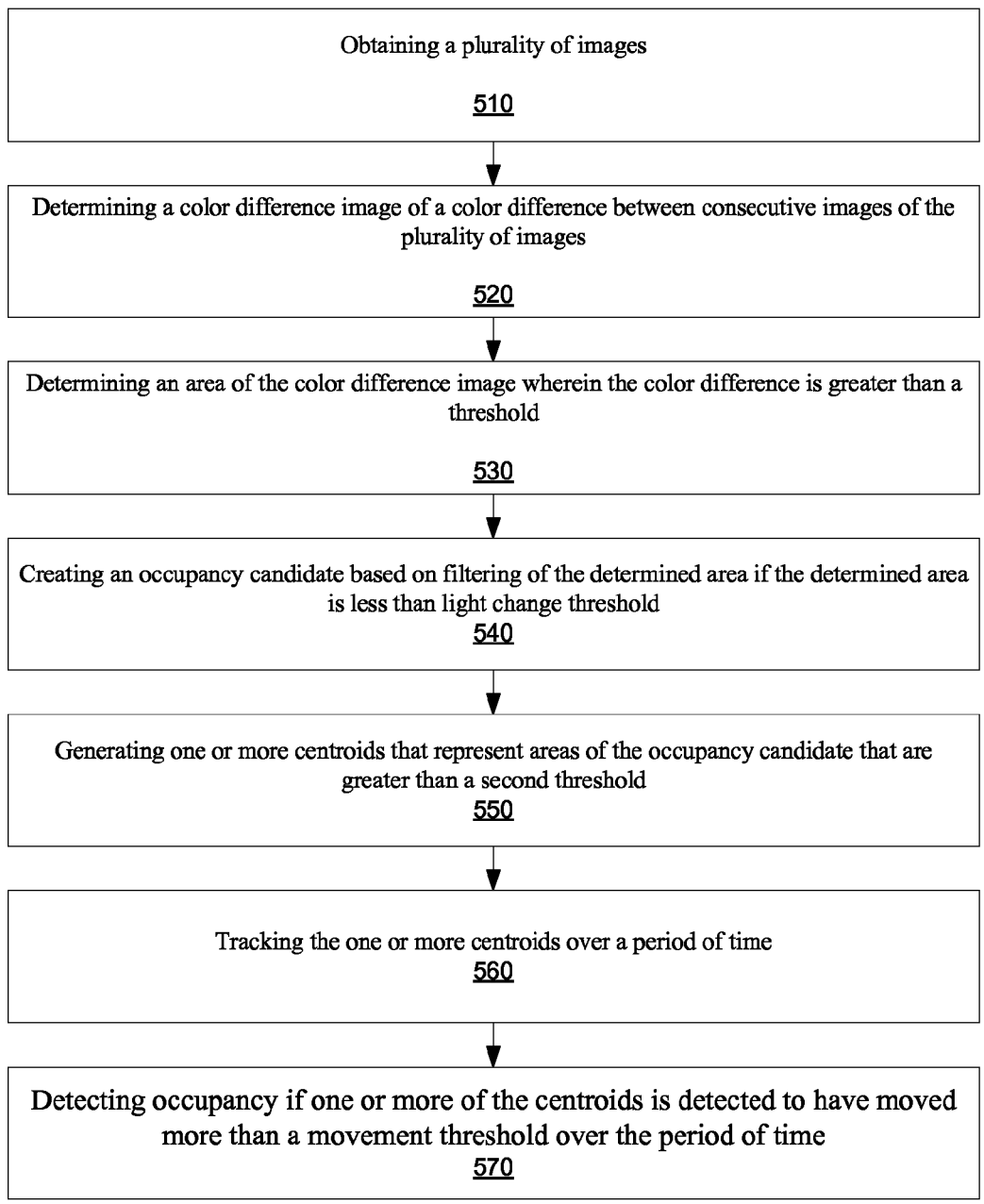
FIG. 5 is a flow chart that includes steps of a method of detecting occupancy, according to an embodiment.

FIG. 5 is a flow chart that includes steps of a method of determining occupancy, according to an embodiment. A first step 510 includes obtaining a plurality of images. A second step 520 includes determining a color difference image of a color difference between consecutive images of the plurality of images. A third step 530 includes determining an area of the color difference image wherein the color difference is greater than a threshold. A fourth step 540 includes creating an occupancy candidate based on filtering of the determined area if the determined area is less than light change threshold. For an embodiment, this includes applying a Gaussian, or Gaussian-like, filter to the thresholded difference image and threshold the filtered result. An embodiment includes applying a connected component analysis to the image obtained to assign a unique label to each connected component. Each connected component represents an occupancy candidate. A fifth step 550 includes generating one or more centroids that represent areas of the occupancy candidate that are greater than a second threshold. Stated differently, this step includes generating one or more centroids of the areas that represent the occupancy candidate(s). A sixth step 560 includes tracking the one or more centroids over a period of time. An seventh step 570 includes detecting occupancy if one or more of the centroids is detected to have moved more than a movement threshold over the period of time.

For an embodiment, the steps of determining a color difference image of a color difference between consecutive images, and determining an area of the color difference image wherein the color difference is greater than a threshold includes converting the plurality of images to a grey scale, determining an absolute value of a difference in the grey scale between consecutive images, and determining an area of the plurality of images wherein the absolute value is greater than a threshold.

More generally, an embodiment of the step of determining a color difference image of a color difference between consecutive images includes determining the difference between pixel values in successive images'. For at least some embodiments, the difference is computed between color values of pixels, or between grey values of pixels. If the difference is computed between color values a conversion to L*a*b* or L*C*h color spaces may be required As previously described, an embodiment further includes down-sampling the plurality of images before converting the plurality of images to a grey scale. For an embodiment, converting the plurality of images to a grey scale includes processing a green channel.

For an embodiment, if the determined area is greater than light change threshold, then it is determined that a lighting changes has occurred not detection of occupancy.

As previously described, for an embodiment filtering of the determined area includes summation filtering of the determined area.

As previously described, an embodiment further includes powering an infrared (IR) illuminator proximate to a device that is obtaining a plurality of images if lighting proximate to the device is sensed to be below a lighting threshold. An embodiment includes reducing a frame or image rate of the plurality of images. Further, for an embodiment the IR illuminator is strobed with a pattern that is synchronous with the frame rate of the plurality of images. The rate can be decreased or controlled to reduce power consumption.

As previously described, an embodiment further includes measuring temporal sequences of movement of the centroids, and comparing the measured temporal sequences to a database of temporal sequences known to be associated with humans, allowing an estimate of a likelihood that one or more humans appear in the plurality of images.

Figure 6:
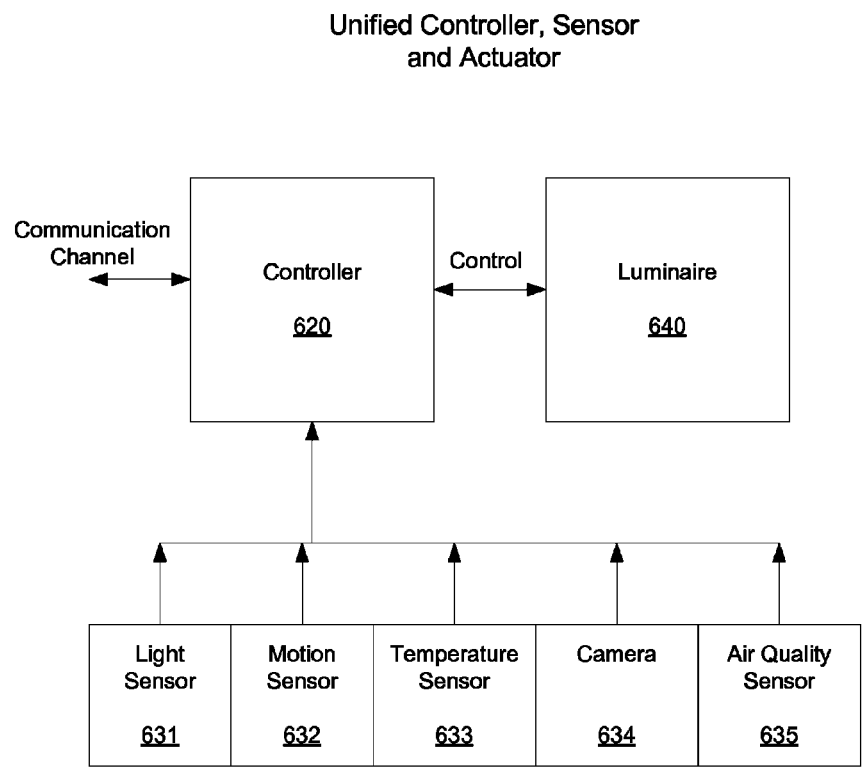
FIG. 6 shows a lighting control sub-system, according to another embodiment.

FIG. 6 shows a lighting control sub-system, according to another embodiment. For at least some embodiments, the lighting control sub-system of FIG. 6 is operationally similar to that of FIG. 3. In contrast to FIG. 3, the embodiment shown in FIG. 6 includes a single controller 620 which controls an intensity of emitted light from a luminaire 640 based on sensed signals from, for example, one or more of a light sensor 631, a motion sensor 632, an temperature sensor 633, a camera (or other type of image sensor) 634 and/or a air quality sensor 634. Clearly, other types of control other than control of a luminaire can additionally or alternatively be included. Further, additional or alternate sensor types can be included.

Figure 7:
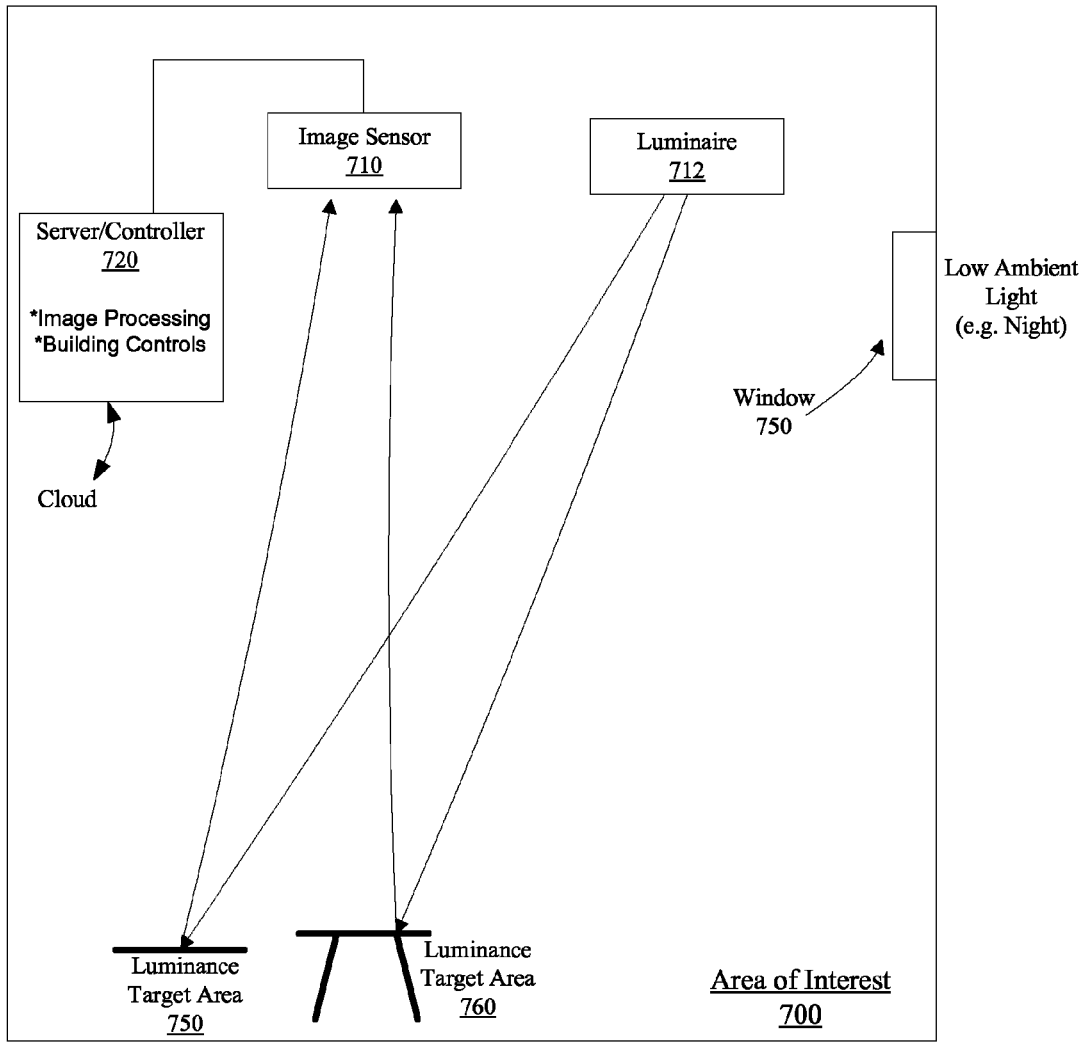
FIG. 7 shows a room wherein the reflectivity of objects within the room is characterized, according to an embodiment.

FIG. 7 shows a room wherein the reflectivity of objects within the room is characterized, according to an embodiment. FIG. 7 shows a room (merely as an example, clearly, other types of areas of interest could be depicted) that includes an area of interest in which ambient light levels are to be detected. As shown, a luminaire 712 emits light. The emitted light reflects off of luminance target areas 750, 760, and the reflected light is received by an image sensor 710. While only a single image sensor 710 is shown, clearly additional images sensors can be included. As shown, the image sensor maintains a communication link with a server/controller 720. As previously described, the server/controller 720 may be included within the image sensor 710, or the server/controller 720 may be a separate unit. Additionally, the server/controller 720 can be networked (for example, through the cloud) to external servers and/or controllers.

For at least some embodiments, the server/controller 720 and/or an external controller electronically connected to the controller are operative to analyze the plurality of images acquired (by the image sensor 710) at a location (the room or area of interest 700) in which occupancy is being detected. Further, the server/controller 720 and/or an external controller electronically connected to the controller are operative to select at least one target area (such as, target areas 750, 760) within the plurality of images which is best suited as an target area for ambient light level sensing, calculate a reflectivity estimate for each of the at least one target area using knowledge of values of applied lighting (for example, values of the lighting intensity of the luminaire 712), calculate ambient lighting estimates for the at least one target area using the calculated reflectivity estimates for the at least one target area, and continuously calculate a total light level in the area of interest using the ambient lighting estimates for the at least one the target.

Descriptively, the described embodiments perform a calibration that includes picking a target geometrical area, measuring a luminance of the target geometrical area using a controlled change to the light level to calculate the reflectivity of the area. The controlled change to the lighting level can be implemented by, for example, switching on individual lights at night when there is little or no externally-generated ambient light. For example, the controlled change of the lighting can be performed, for example, at night when the ambient light passing through, for example, the window 750 is low. The calibration can be repeated for a number of areas in the image.

For at least some embodiments, the calibration results in a vector of sampled image areas and associated reflectivity estimates. For at least some embodiments, in operation, the reflectivity estimates are used to calculate an overall ambient light estimate for the area of interest. If one particular target area varies by more than a threshold above what the whole scene brightness varies, then it is determined that area has undergone a reflectivity change and that area can be marked for recalibration.

The described embodiments can be used with a single area covering the whole area of interest in which case the aggregate reflectivity of the whole area of interest is calibrated and the aggregate reflected light used to estimate the ambient light level. A calibrated source of light is required to make the reflectivity estimates. This can be obtained by modeling a luminaire and bulb/tube combination as long the luminaire is under the control of the controller. The modeling can consist of either measuring the output of the luminaire, or the light generated inside the luminaire, using a brightness sensor and combining that with a model of the luminaire optics and area of interest geometry to generate an estimate of the calibrator light falling on the area of interest, or measuring electrical characteristics of the bulb/tube, and combining that with a model of the bulb/tube and the luminaire and the area of interest geometry to generate an estimate of the calibrator light falling on the area of interest, or use a calibrated strobe light (which may be low intensity) to illuminate the area of interest.

Figure 8:
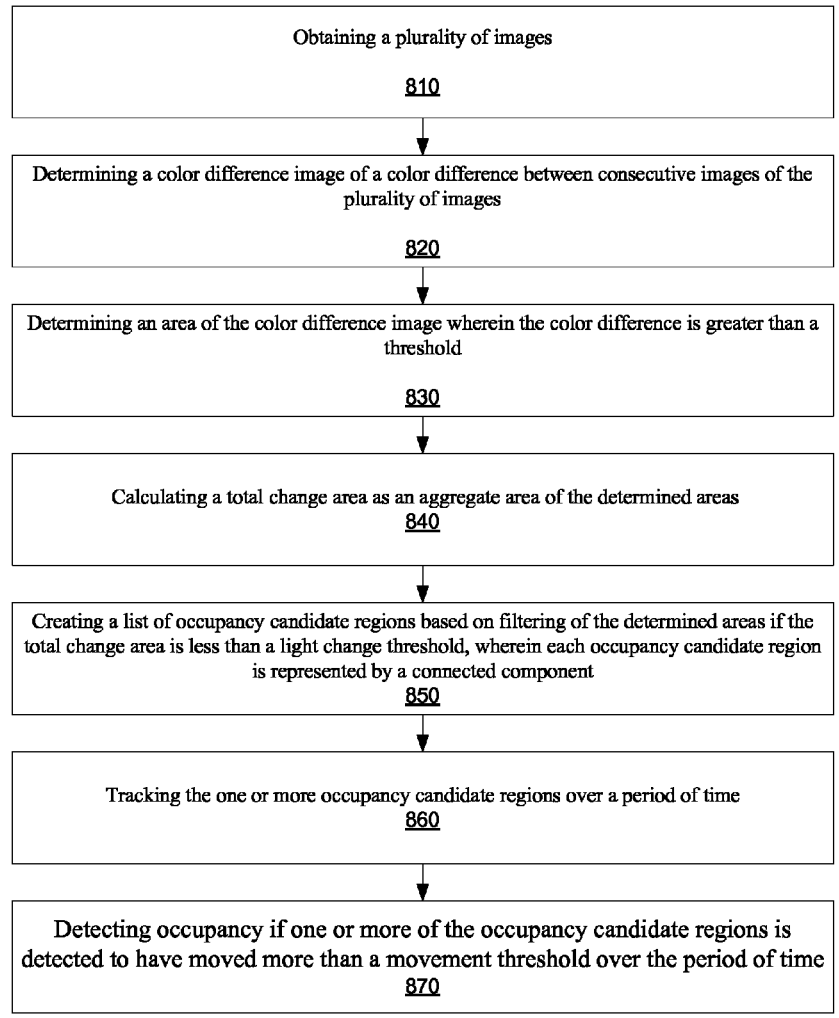
FIG. 8 is a flow chart that includes steps of another method of detecting occupancy, according to an embodiment.

FIG. 8 is a flow chart that includes steps of another method of detecting occupancy, according to an embodiment. A first step 810 includes obtaining a plurality of images. A second step 820 includes determining a color difference image of a color difference between consecutive images. For at least some embodiments, the color difference image is computed by calculating the absolute value of the distance in color space between corresponding pixels in consecutive images. Examples of suitable color spaces are CIE76, CIE94 and CIEDE2000. To calculate the color difference image, the consecutive images from the image sensor must first be converted into the selected color space. A third step 830 includes determining areas of the color difference image wherein the color difference is greater than a threshold. For an embodiment, the absolute value of the difference between a present frame and the previous one is computed and threshold detected at some level to eliminate noise. Any differences that exceed the threshold level are assumed to be the result of something moving in the interval between the frames. A fourth step 840 includes calculating a total change area as an aggregate area of the determined areas. A fifth step 850 includes creating a list of occupancy candidates based on filtering of the determined areas if the total change area is less than a light change threshold, wherein each occupancy candidate is represented by a connected component. For an embodiment, the light change threshold is selected to be the minimum number of changed pixels that represent a change in lighting conditions. If more pixels have changed than the light change threshold, a lighting change is deemed to have occurred. For an embodiment, the light change threshold is a function of the distance from the image sensor to the area of interest, the size of moving objects in the area of interest, and the optical properties of the background of the area of interest and any moving objects in the area of interest. A sixth step 860 includes tracking the one or more occupancy candidates over a period of time. A seventh step 870 includes detecting occupancy if one or more of the occupancy candidates is detected to have moved more than a movement threshold over the period of time.

As previously described, an embodiment further includes powering an infrared (IR) illuminator proximate to a device that is obtaining a plurality of images if lighting proximate to the device is sensed to be below a lighting threshold. As previously described, an embodiment further includes reducing a frame or image rate of the plurality of images. As previously described, for an embodiment the IR illuminator is strobed with a pattern that is synchronous with a frame capture times sequence of the plurality of images.

As previously described, an embodiment further includes measuring temporal sequences of movement of the centroids, and comparing the measured temporal sequences to a database of temporal sequences known to be associated with humans, allowing an estimate of a likelihood that one or more humans appear in the plurality of images.

Although specific embodiments have been described and illustrated, the described embodiments are not to be limited to the specific forms or arrangements of parts so described and illustrated. The embodiments are limited only by the appended claims.

What is claimed:

1. An apparatus, comprising:
   at least one image sensor;
   a controller, wherein at least one of the controller, or an external controller electronically connected to the controller are operative to:
   obtain a plurality of images from the image sensor;
   determine a color difference image of a color difference between consecutive images;
   determine areas of the color difference image wherein the color difference is greater than a threshold;
   calculate a total change area as an aggregate area of the determined areas;
   create a list of occupancy candidates based on filtering of the determined areas if the total change area is less than a light change threshold, wherein each occupancy candidate is represented by a connected component;
   track the one or more occupancy candidates over a period of time; and
   detect occupancy if one or more of the occupancy candidates is detected to have moved more than a movement threshold over the period of time.

2. The apparatus of claim 1, wherein the apparatus is further operative to power an infrared (IR) illuminator proximate the at least one sensor if lighting proximate to the apparatus is sensed to be below a lighting threshold.

3. The apparatus of claim 2, wherein the controller is further operative reduce a frame or image rate of the plurality of images.

4. The apparatus of claim 2, wherein the IR illuminator is strobed with a pattern that is synchronous with a frame capture times sequence of the plurality of images.

5. The apparatus of claim 1, wherein the controller is further operative to measure temporal sequences of movement of the occupancy candidates, and comparing the measured temporal sequences to a database of temporal sequences known to be associated with humans, allowing an estimate of a likelihood that one or more humans appear in the plurality of images.

6. A method of detecting occupancy, comprising:
   obtaining a plurality of images;
   determining a color difference image of a color difference between consecutive images;
   determining areas of the color difference image wherein the color difference is greater than a threshold;
   calculating a total change area as an aggregate area of the determined areas;
   creating a list of occupancy candidates based on filtering of the determined areas if the total change area is less than a light change threshold, wherein each occupancy candidate is represented by a connected component;
   tracking the one or more occupancy candidates over a period of time; and
   detecting occupancy if one or more of the occupancy candidates is detected to have moved more than a movement threshold over the period of time.

7. The method of claim 6, further comprising powering an infrared (IR) illuminator proximate to a device that is obtaining a plurality of images if lighting proximate to the device is sensed to be below a lighting threshold.

8. The method of claim 7, further comprising reducing a frame or image rate of the plurality of images.

9. The method of claim 8, wherein the IR illuminator is strobed with a pattern that is synchronous with a frame capture times sequence of the plurality of images.

10. The method of claim 6, further comprising measuring temporal sequences of movement of the occupancy candidates, and comparing the measured temporal sequences to a database of temporal sequences known to be associated with humans, allowing an estimate of a likelihood that one or more humans appear in the plurality of images.

* * * * *